United States Patent
Kappauf et al.

(10) Patent No.: US 10,528,055 B2
(45) Date of Patent: Jan. 7, 2020

(54) ROAD SIGN RECOGNITION

(71) Applicant: Ford Global Technologies, LLC, Dearborn, MI (US)

(72) Inventors: Collin Kappauf, Dearborn, MI (US); Andrew Richardson, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 88 days.

(21) Appl. No.: 15/342,405

(22) Filed: Nov. 3, 2016

(65) Prior Publication Data
US 2018/0120857 A1    May 3, 2018

(51) Int. Cl.
| | |
|---|---|
| *G05D 1/02* | (2006.01) |
| *G01C 21/36* | (2006.01) |
| *G01S 17/02* | (2006.01) |
| *G01S 17/06* | (2006.01) |
| *G01S 17/93* | (2006.01) |
| *G06K 9/00* | (2006.01) |
| *G06K 9/78* | (2006.01) |

(52) U.S. Cl.
CPC ......... *G05D 1/0236* (2013.01); *G01C 21/362* (2013.01); *G01S 17/023* (2013.01); *G01S 17/06* (2013.01); *G01S 17/936* (2013.01); *G06K 9/00818* (2013.01); *G06K 9/78* (2013.01); *G06K 2209/01* (2013.01)

(58) Field of Classification Search
CPC ..... G05D 1/0236; G01S 17/023; G01S 17/06; G01S 21/362; G01S 17/936; G06K 9/00818; G06K 9/78; G06K 2209/01
See application file for complete search history.

(56) References Cited

U.S. PATENT DOCUMENTS

| | | | | |
|---|---|---|---|---|
| 6,058,339 A | * | 5/2000 | Takiguchi | ............ G05D 1/0234 180/169 |
| 6,064,926 A | * | 5/2000 | Sarangapani | ........ G05D 1/0289 701/26 |
| 8,761,435 B2 | | 6/2014 | Chen | |
| 8,996,228 B1 | * | 3/2015 | Ferguson | ........... G01C 21/3461 701/28 |

(Continued)

FOREIGN PATENT DOCUMENTS

| | | |
|---|---|---|
| KR | 1020130004746 A | 1/2013 |
| KR | 1020160062261 A | 6/2016 |

OTHER PUBLICATIONS

Zhao et al., "An efficient extrinsic calibration of a multiple laser scanners and cameras' sensor system on a mobile platform", Intelligent Vehicles Symposium, 2007 IEEE, Jun. 13-15, 2007.

(Continued)

*Primary Examiner* — Thomas Ingram
(74) *Attorney, Agent, or Firm* — Frank A. MacKenzie; Bejin Bieneman PLC (57) ABSTRACT

Vehicles can be equipped with computing devices, networks, sensors and controllers to determine, modify, and/or augment a digital map of the surrounding real world. Computing devices included in a vehicle can determine road sign locations in LIDAR data. The computing devices can identify road signs in one or more video images based on the road sign locations and include the road sign in a digital map based on the road sign identity and the road sign location.

16 Claims, 9 Drawing Sheets

(56) References Cited

U.S. PATENT DOCUMENTS

| | | | |
|---|---|---|---|
| 9,037,403 B2 | 5/2015 | Delp | |
| 9,056,395 B1* | 6/2015 | Ferguson | G08G 1/09623 |
| 9,062,979 B1 | 6/2015 | Ferguson et al. | |
| 9,097,800 B1 | 8/2015 | Zhu | |
| 9,424,475 B1* | 8/2016 | Lo | G06K 9/4604 |
| 10,223,600 B2* | 3/2019 | Fischer | G01S 13/931 |
| 2004/0178894 A1* | 9/2004 | Janssen | B60K 35/00 |
| | | | 340/435 |
| 2010/0026555 A1 | 2/2010 | Whittaker et al. | |
| 2010/0256867 A1* | 10/2010 | Breuer | G07C 5/0891 |
| | | | 701/33.4 |
| 2011/0149064 A1* | 6/2011 | Uehira | H04N 7/183 |
| | | | 348/118 |
| 2011/0150348 A1* | 6/2011 | Anderson | G05D 1/0088 |
| | | | 382/224 |
| 2012/0022764 A1* | 1/2012 | Tang | B60W 10/06 |
| | | | 701/102 |
| 2012/0046820 A1* | 2/2012 | Allard | B60T 7/22 |
| | | | 701/25 |
| 2012/0083960 A1* | 4/2012 | Zhu | G05D 1/0214 |
| | | | 701/23 |
| 2014/0063232 A1* | 3/2014 | Fairfield | G06K 9/78 |
| | | | 348/118 |
| 2015/0220795 A1* | 8/2015 | Fischer | G01S 13/931 |
| | | | 348/148 |
| 2016/0034769 A1 | 2/2016 | Singh | |
| 2017/0242441 A1* | 8/2017 | Nakaya | G05D 1/0248 |

OTHER PUBLICATIONS

UK Search Report dated May 8, 2018 re GB Appl. No. 1717747.8.

* cited by examiner

ROAD SIGN RECOGNITION

BACKGROUND

Digital maps are now widely used for a variety of purposes, including monitoring traffic and road conditions, planning routes, locating landmarks such as retail establishments, parks, etc., and/or navigation of an autonomous or semi-autonomous vehicle along a route according to information on the digital map. Road signs can convey useful information about a planned or potential vehicle route, e.g., speed limits, stop signs, lane shifts, etc. However, digital maps at present are often out-of-date or inaccurate, e.g., because signs have not been properly included on the digital maps, signs have been posted or taken down since a last update, etc., or the potential vehicle route has not been mapped to provide a digital map.

DETAILED DESCRIPTION

Vehicles can be equipped with computing devices, networks, sensors and controllers to determine, modify, and/or augment a digital map of the surrounding real world. Such map can be used for a variety of purposes, e.g., to determine possible routes, to pilot an autonomous vehicle, and/or to assist an occupant in piloting a vehicle. Vehicle sensors can include LIDAR sensors, which can provide data to determine the identity and location of road signs. The identity and location of road signs can be included in the digital map. The digital map can be uploaded to a server computer for access and distribution for the foregoing, or other, uses.

Vehicles can be equipped to operate in both autonomous and occupant piloted mode. By a semi- or fully-autonomous mode, we mean a mode of operation wherein a vehicle can be piloted by a computing device as part of a vehicle information system having sensors and controllers. The vehicle can be occupied or unoccupied, but in either case the vehicle can be piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering.

Vehicles can be equipped with computing devices, networks, sensors and controllers to pilot the vehicle and to determine maps of the surrounding real world including features such as roads. Vehicles can be piloted and maps can be determined based on locating and identifying road signs in the surrounding real world. By piloting we mean directing the movements of a vehicle so as to move the vehicle to a destination.

Figure 1:
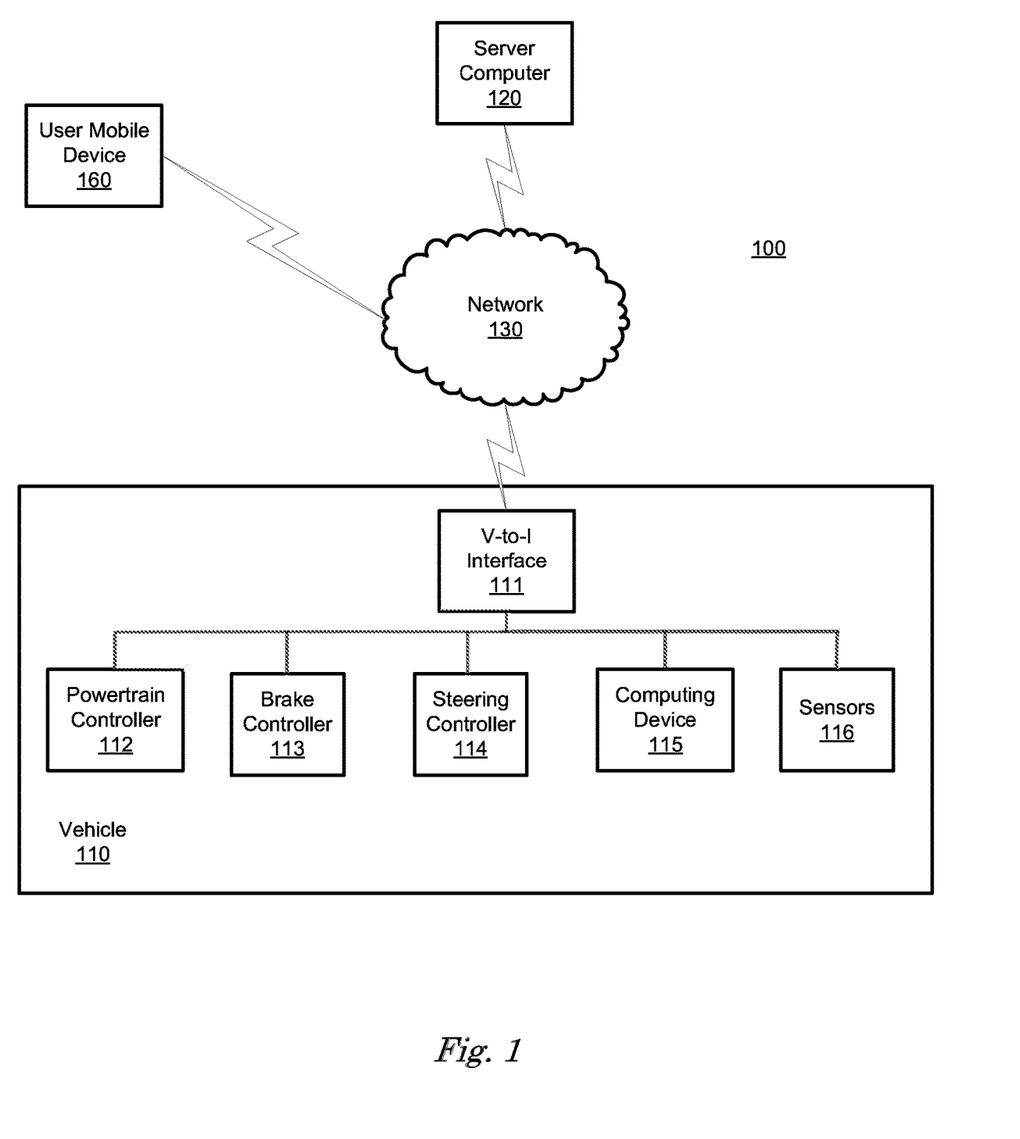
FIG. 1 is a block diagram of an example vehicle.

FIG. 1 is a diagram of a vehicle information system 100 that includes a vehicle 110 operable in autonomous ("autonomous" by itself in this disclosure means "fully autonomous") and occupant piloted (also referred to as non-autonomous) mode in accordance with disclosed implementations. Vehicle 110 also includes one or more computing devices 115 for performing computations for piloting the vehicle 110 during autonomous operation. Computing devices 115 can receive information regarding the operation of the vehicle from sensors 116.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network such as a bus in the vehicle 110 such as a controller area network (CAN) or the like; the vehicle 110 network can include wired or wireless communication mechanism such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, may utilize various wired and/or wireless networking technologies, e.g., cellular, BLUETOOTH® and wired and/or wireless packet networks. The computing device 115 also includes nonvolatile memory such as are known. Computing device can log information by storing the information in nonvolatile memory for later retrieval and transmittal via the vehicle communication network and V-to-I interface 111 to a server computer 120 or user mobile device 160.

As already mentioned, generally included in instructions stored in the memory and executed by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors such as speed, acceleration, deceleration, steering, etc., as well as tactical behaviors such as a distance between vehicles and/or amount of time between vehicles, lane-change minimum gap between vehicles, left-turn-across-path minimum, time-to-arrival at a particular location and intersection (without signal) minimum time-to-arrival to cross the intersection.

Controllers, as that term is used herein, include computing devices that typically are programmed to control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113 and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computer 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide a geographical coordinates of the vehicle 110. The distance provided by the radar or the geographical coordinates provided by the GPS sensor may be used by the computing device 115 to operate the vehicle 110 autonomously or semi-autonomously.

The vehicle 110 is generally a land-based autonomous vehicle 110 having three or more wheels, e.g., a passenger car, light truck, etc. The vehicle 110 includes one or more sensors 116, the V-to-I interface 111, the computing device 115 and one or more controllers 112, 113, 114.

The sensors 116 may be programmed to collect data related to the vehicle 110 and the environment in which the vehicle 110 is operating. By way of example, and not limitation, sensors 116 may include, e.g., altimeters, cameras, LiDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating such as weather conditions, the grade of a road, the location of a road or locations of neighboring vehicles 110. The sensors 116 may further be used to collect dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components and electrical and logical health of the vehicle 110.

Figure 2:
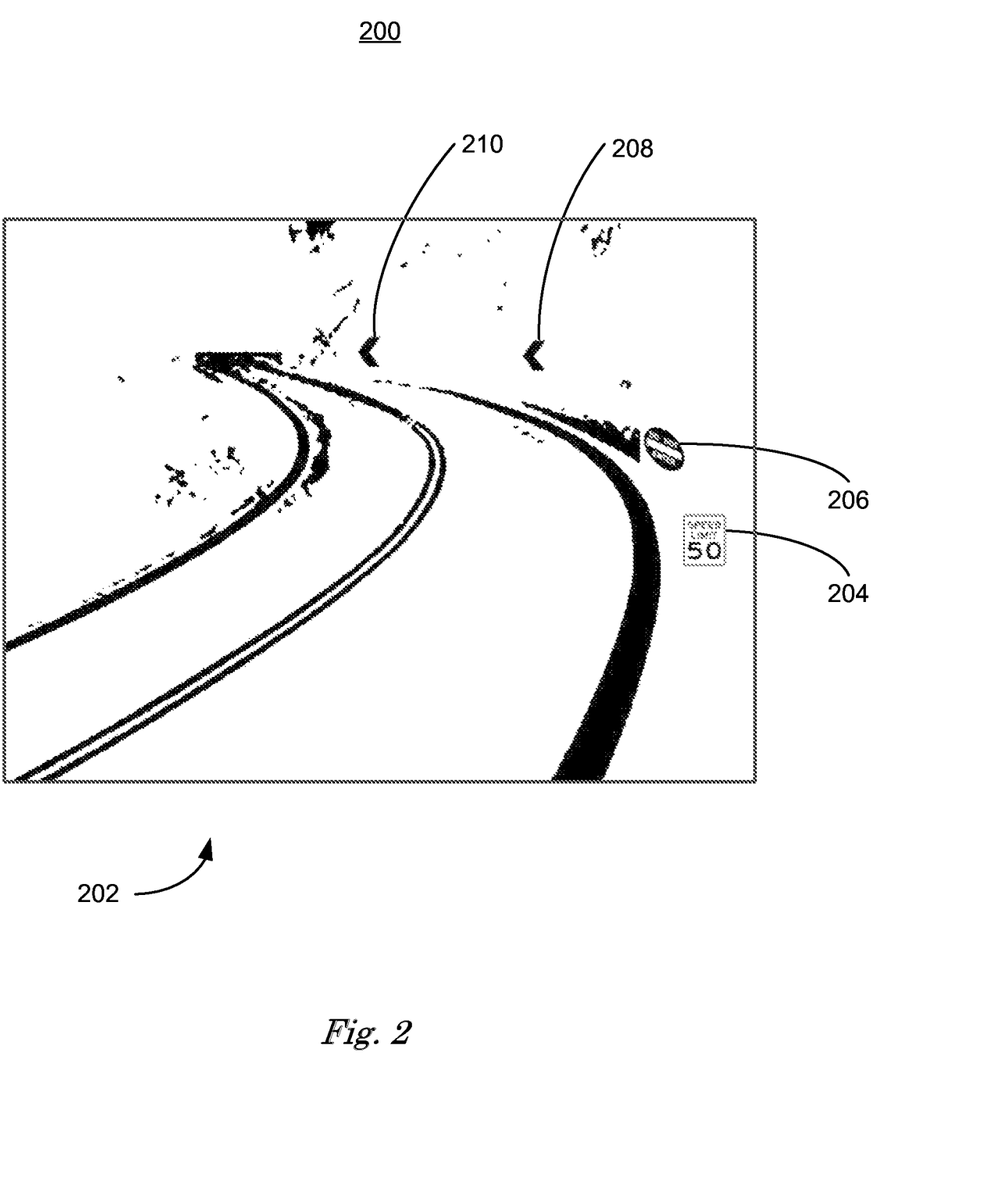
FIG. 2 is a diagram of an example video image of a road with road signs.

FIG. 2 is a diagram of a video image 200 acquired by a video camera included in sensors 116, for example. Video image 200 was acquired from a video camera so as to include a scene in the real world forward and in the direction of movement of the vehicle 110 and includes an image of a road 202 and images of a speed limit road sign 204, a do not enter road sign 206, a first left arrow road sign 208 and a second left arrow road sign 210, referred herein as road signs 204, 206, 208, 210.

Figure 3:
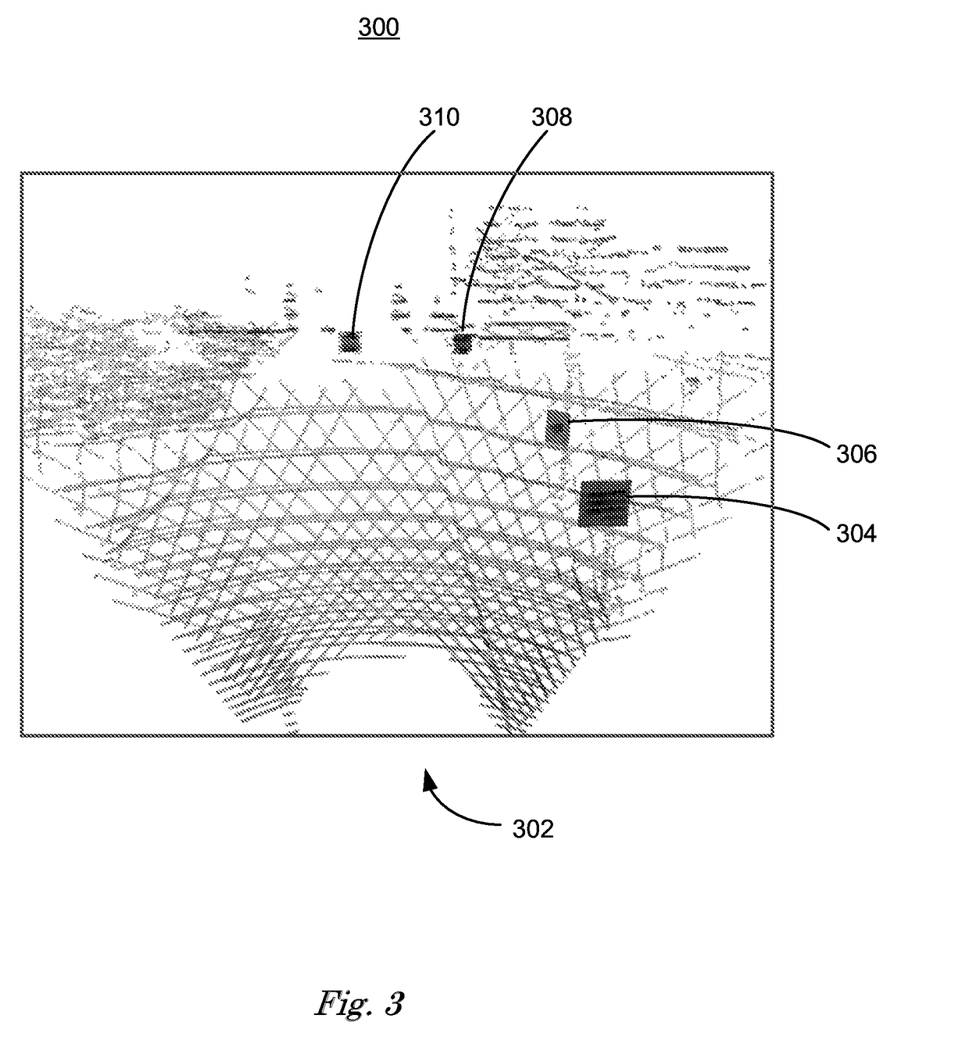
FIG. 3 is a diagram of example LIDAR data with road signs.

FIG. 3 is a diagram of LIDAR data 300 acquired by a LIDAR system included in sensors 116, for example. LIDAR is a contraction of LIght raDAR and includes determining 3D ranges or distances to points in a scene by transmitting and receiving scanned pulses of light, which can be from a laser, and measuring the time of flight, for example. The LIDAR system can acquire LIDAR data 300 from a scene in the real world in all directions about the vehicle 110 including directions corresponding to video image 200.

The light pulses reflected by the scene in the real world produce returns 302 along scan lines which can be determined by a laser included in LIDAR system, for example. The returns include the intensity of the signal and the 3D distance or range to the points in the scene illuminated by the laser as it scans the scene. LIDAR data 300 can include samples taken along parallel scan lines at various angles as shown in LIDAR data 300.

LIDAR data 300 includes the intensity signal and the 3D ranges or distances associated with returns 302. The 3D ranges or distances associated with returns 302 are not shown. Speed limit road sign 204, do not enter road sign 206, first left arrow road sign 208 and second left arrow road sign 210 produce areas with high-intensity returns 304, 306, 308, 310. Road signs can produce high-intensity returns in LIDAR data 300 since road signs can be coated with reflective paint that includes microscopic lenticular elements, for example, that make the road sign highly reflective regardless of the angle at which it is illuminated and viewed.

Figure 4:
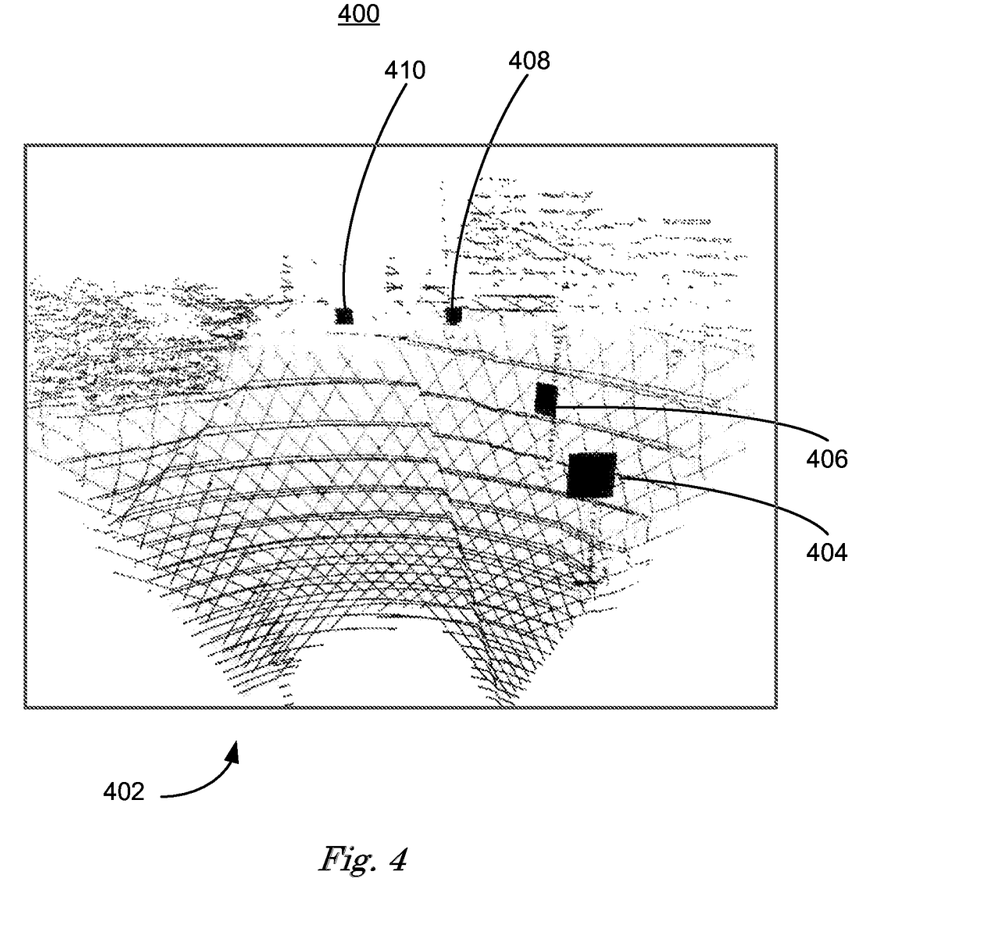
FIG. 4 is a diagram of a further example LIDAR data with road signs.

FIG. 4 is a diagram of LIDAR data 400 that has been filtered to remove all but high-intensity returns 402, 404, 406, 408, 410 in LIDAR data 400 by filtering out low-intensity returns. Filtering out low-intensity returns can be based on a predetermined threshold or can use known machine vision techniques to filter out low-intensity returns by combining thresholds and values of surrounding returns, for example. An example of machine vision techniques to filter out low-intensity returns can include thresholding the LIDAR data 300 followed by morphological processing to eliminate isolated high-intensity returns, for example.

Figure 5:
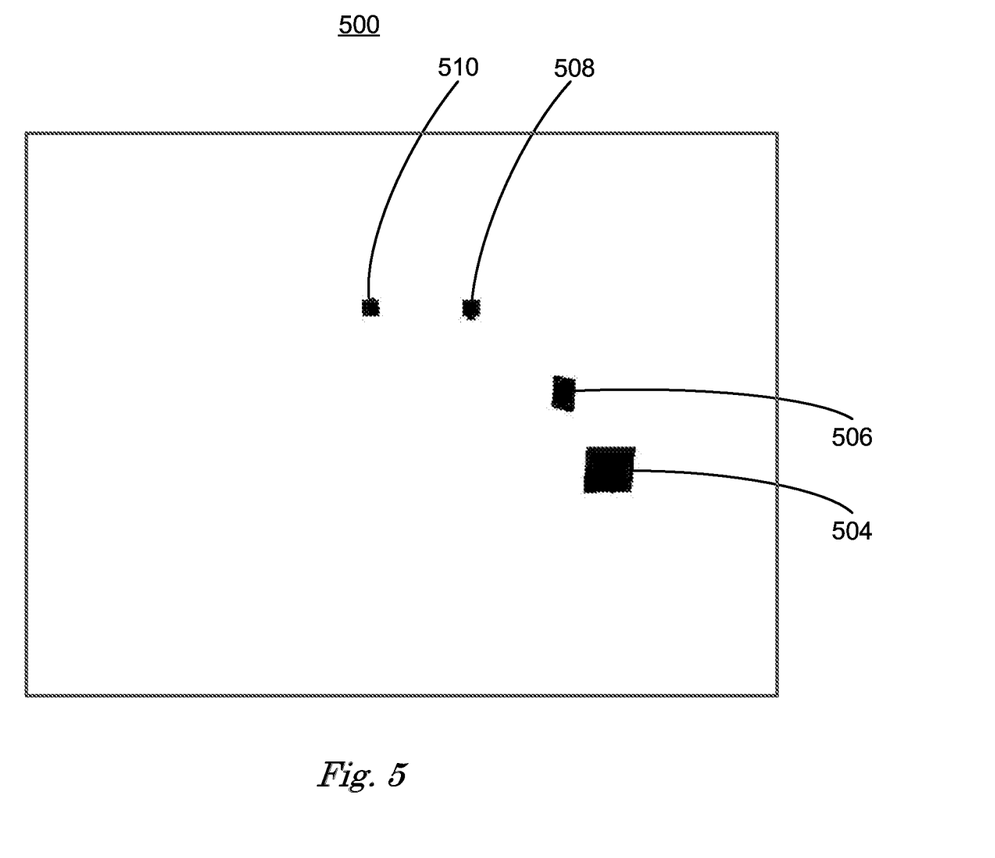
FIG. 5 is a diagram of a yet further example of LIDAR data with road signs.

FIG. 5 is a diagram of LIDAR data 500 that has been processed with cluster analysis. Cluster analysis is a technique for determining connected regions or groups in a spatial domain by measuring statistical distributions based on nearness and similarity of data points. Several different techniques are known for performing cluster analysis on LIDAR data 500, including connectivity-based, centroid-based, distribution-based and density-based cluster analysis, for example.

Cluster analysis can group similar data points into a small number of connected groups based on nearness criteria.

Clusters 504, 506, 508, 510 can be determined in LIDAR data 500, for example, by grouping high-intensity returns 402, 404, 406, 408, 410 into clusters based on the density of high-intensity returns 402, 404, 406, 408, 410, according to predetermined parameters thereby determining clusters 504, 506, 508, 510.

Cluster analysis can be combined with filters to filter out clusters 504, 506, 508, 510 smaller and larger than a predetermined size range. In this fashion clusters 504, 506, 508, 510 that are smaller than a predetermined size can be filtered out of LIDAR data 500 since the video data associated with the cluster 504, 506, 508, 510 can be too small according to predetermined parameters to be associated with a road sign 204, 206, 208, 210.

Figure 6:
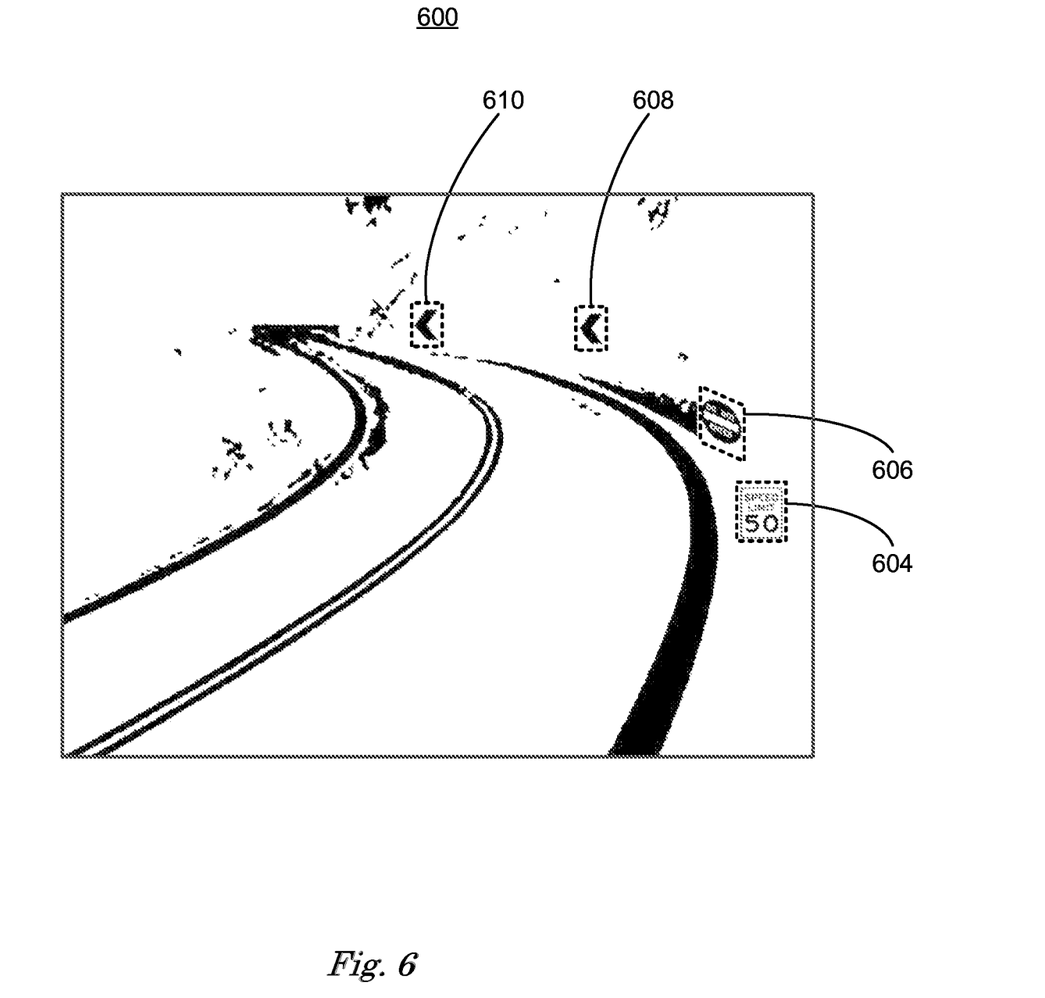
FIG. 6 is a diagram of a further example video image of a road with road signs.

In other cases, clusters 504, 506, 508, 510 can be large enough to be associated with road signs 204, 206, 208, 210 but not large enough to support character recognition and sign matching, since known techniques for performing character recognition and sign matching can require minimum feature sizes to successfully perform. In yet other cases, clusters 504, 506, 508, 51 can be large enough to be associated with a road signs 204, 206, 208, 210 but pose, as defined below, associated with the clusters 504, 506, 508, 510 indicates that video images associated with sign locations 604, 606, 608, 610 would be too distorted to support character recognition and sign matching.

Clusters 504, 506, 508, 510 that are larger than road signs 204, 206, 208, 210 cannot be filtered out since they might include groups of road signs 204, 206, 208, 210. Upper limits for size filters can depend upon the location of road signs 204, 206, 208, 210. For example, overhead road signs on divided highways are large in comparison with roadside road signs 204, 206, 208, 210. As will be described in more detail below, computing device 115 can maintain a database associated with road signs 202, 204, 206, 208. The database can include map information including expected sizes for road signs 202, 204, 206, 208 at or near the locations, as defined below, of clusters 504, 506, 508, 510.

In LIDAR data 500, clusters 504, 506, 508, 510 correspond to road signs 204, 206, 208, 210 respectively. Cluster analysis can be combined with plane-fitting using least squares techniques, for example to determine the location, size and pose of best-fit planes for each cluster 504, 506, 508, 510, where location is defined as the X, Y and Z coordinates of the cluster 504, 506, 508, 510 in 3D space, size is defined as the dimensions of best-fit planar shapes to the clusters 504, 506, 508, 510 and pose is defined as the orientation of a plane in 3D space as determined by rotations about the X, Y and Z axes.

FIG. 6 shows a diagram of a video image 600 with sign locations 604, 606, 608, 610. Sign locations 604, 606, 608, 610 are determined based on clusters 504, 506, 508, 510 determined in LIDAR data 500 by cluster analysis as discussed above. Since LIDAR data 500 includes 3D range or distances, the angle and distance to clusters 504, 506, 508, 510 from vehicle 110 are known. Because the location of the video camera and the focal distance and optical magnification of the optical system are known, the location of clusters 504, 506, 508, 510 in video image 600 can be determined, e.g., according to known techniques. Location(s) of clusters 504, 506, 508, 510 can then be projected onto video image 600 using known display techniques as sign locations 604, 606, 608, 610 respectively.

Figure 7:
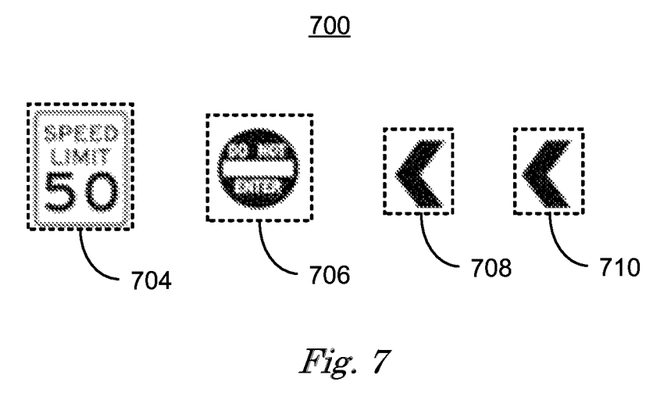
FIG. 7 is a diagram of a further example of video images of road signs.

Video images associated with sign locations 604, 606, 608, 610 can be isolated and transformed homographically to generate a vertically-oriented, front-on view of planar surfaces that are then projected onto primary faces of signs locations 604, 606, 608, 610 to produce road signs 704, 706, 708, 710, herein referred to as road signs 700, as seen in FIG. 7. The pose associated with each cluster 504, 506, 508, 510 can be used to "de-skew" isolated video images associated with road sign locations 604, 606, 608, 610 by homographic projection to produce road signs 700 based on the isolated video images associated with road sign locations 604, 606, 608, 610.

Homographic projection is a known machine vision technique that, in this example, transforms and re-projects the isolated video images associated with road sign locations 604, 606, 608, 610 to appear as if the camera acquiring the video image associated with road sign locations 604, 606, 608, 610 were viewed at right angles to the primary face of road signs 700 to assist character recognition and sign matching.

An example of homographic projection is illustrated by comparing the video image of a "DO NOT ENTER" sign 606 from video image 600, where the primary face of "DO NOT ENTER" sign 606 is at an angle to the image plane, resulting in a non-rectangular isolated video image associated with road sign location 606. Non-rectangular isolated video image associated with road sign location 606 can be transformed into rectangular road sign 706 using homographic projection parameters based on the determined pose of cluster 506 in LIDAR data 500, for example.

Homographic projection parameters can include the angle between a perpendicular to the primary face of a road sign 700 and a perpendicular to a plane fit to a cluster 504, 506, 508, 510 and the difference in size between the primary face of a road sign 700 and size of a plane fit to a cluster 504, 506, 508, 510, for example. Homographic project can transform a distorted image of a road sign 700 represented by video images associated with sign locations 604, 606, 608, 610 into undistorted road signs 700.

Following homographic projection, known machine vision techniques can be applied to road signs 700 to determine semantics associated with the road signs 700 including characters, words, shapes and colors. Other semantics associated with the road signs 700 include location and pose. Semantics associated with road signs 700 can be determined by performing character recognition and sign matching on road signs 700 with known machine vision techniques including optical character recognition (OCR) to recognize characters and words and normalized correlation to recognize shapes, for example.

Sign matching can determine semantics associated with pictograph signs, for example. Sign matching can be made robust with respect to defaced signs by inferring semantics from the sign shape and sign color, e.g. stop signs or yield signs, for example. In addition to characters and words associated with road signs 700, the location and pose of the road signs 700 with respect to the vehicle 110 can provide piloting information, for example.

For example, positions and poses of road signs 700 can determine location and direction of road 202 with respect to vehicle 110, since a location and pose of road signs 700 with respect to road 202 can be predetermined and included in a database included in nonvolatile memory associated with computing device 115. Based on the locations and poses of road signs 700 and a database of road sign locations and poses, the location and pose of vehicle 110 with respect to road 202 can be determined.

Since road signs 700 are located within a predetermined range of distances at a predetermined range of poses from road 202, in the absence of database information regarding road sign 700 locations and poses, the location of a road 202 can be determined by combining semantics associated with road signs 700 with LIDAR data 300, 400, 500 including 3D range information and video images 200, 600 to determine the location of road 202 with respect to vehicle 110.

Navigation processes included in computing device 115 can include a database of road sign semantics in nonvolatile memory including text, shapes, designs and colors associated with the universe of possible road signs. Since road signs are uniform by country or region, navigation processes can be updated to include local road sign semantics by determining the vehicle's location using GPS, for example.

Navigation processes can include commands and rules associated with semantics associated with road signs 700, where commands include signals sent by computing device 115 to controllers 112, 113, 114 to control the movement of vehicle 110 and rules includes limits set on parameters associated with the vehicle's location, movement and operating state. Commands and rules determined by semantics associated with road signs 700 can be used by navigation processes included in computing device 115 to determine a safe path and legal speed at which to pilot vehicle 110 in the real world.

For example, semantics associated with road sign 704 can be associated with a rule to not exceed 50 mph. In response to this rule, computing device 115 issues commands to controllers 112, 113, 114 to make vehicle 110 travel at less than 50 mph. Semantics associated with road sign 706 can be associated with a rule not to turn right at inappropriate times, for example. In this case computing device 115 would issue not commands to controllers 112, 113, 114 to turn right at inappropriate times. Semantics associated with road signs 708, 710 can be associated with a rule to restrict movements of vehicle 110 to appropriate lanes of road 202 and include the computing device 115 issuing commands to turn left to controllers 112, 113, 114 to control the speed and direction of vehicle's 110 movement at the appropriate time to turn left and stay in an appropriate lane on road 202.

Figure 8:
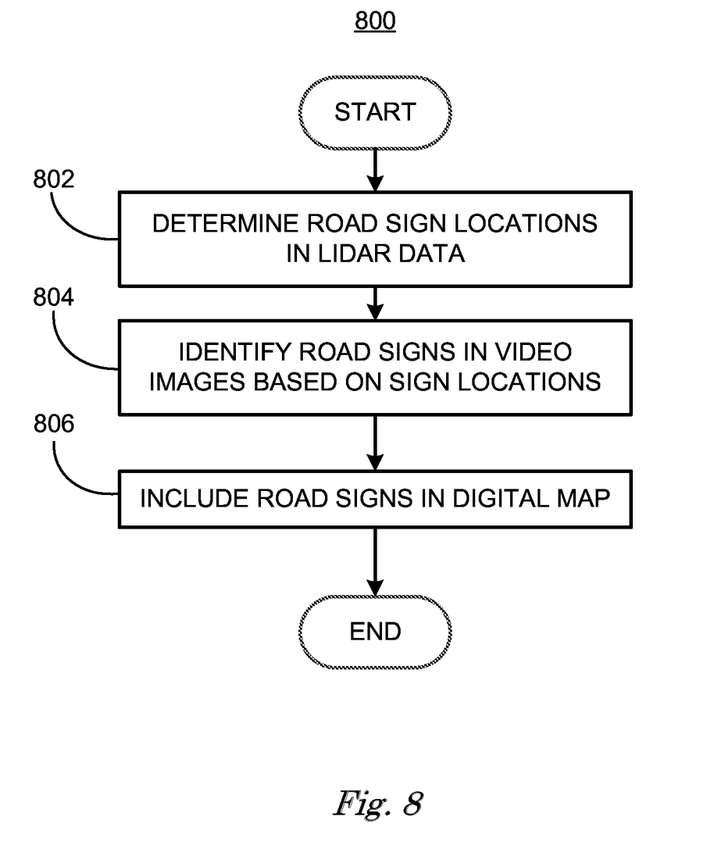
FIG. 8 is a flowchart diagram of a process to pilot a vehicle based on road signs.

FIG. 8 is a flowchart diagram of a process 800 for piloting vehicles 110 in autonomous operation described in relation to FIGS. 2-7. Process 800 can be implemented by a processor of computing device 115, taking as input information from sensors 116, and executing instructions and sending control signals via controllers 112, 113, 114, for example. Process 800 includes multiple steps taken in the disclosed order. Process 800 also includes implementations including fewer steps or can include the steps taken in different orders.

Process 800 begins at step 802, where computing device 115 according to the process 800 determines road sign locations 604, 606, 608, 610 associated with road signs 204, 206, 208, 210 in LIDAR data 500 as described above in relation to FIGS. 3-5 above. By determine we mean identify, compute, quantify, find, locate, identify or in any manner whatsoever determine road sign location. Road signs 204, 206, 208, 210 are planar reflective objects with graphics meant to be viewed by occupants to assist them in piloting occupant-piloted vehicles safely and legally. Computing device 115 can determine road sign locations 604, 606, 608, 610 as described above in relation to FIGS. 3-5 by determining the location and pose of clusters 504, 506, 508, 510 in high-intensity LIDAR data 500 that correspond to road sign locations 604, 606, 608, 610 using cluster analysis.

Next, at step 804 road signs 700 are identified in video images 200, 600 based on sign locations 604, 606, 608, 610. As discussed above in relation to FIG. 6 sign locations 604, 606, 608, 610 determined in LIDAR data 500 can be applied to video image 600 to isolate video images of road signs 204, 206, 208, 210 associated with the sign locations 604, 606, 608, 610. The isolated video images associated with sign locations 604, 606, 608, 610 can be homographically transformed and projected as described above in regard to FIGS. 6 and 7, to produce road signs 700.

Semantics associated with road signs 700 can be determined by computing device 115 using character recognition and sign matching as discussed above in regard to FIG. 7 to determine semantics associated with road signs 700. Semantics associated with road signs 700 can include text, shapes, locations, poses, and colors, for example. In this example semantics associated with road signs 700 include "SPEED LIMIT 50 MPH", "DO NOT ENTER" and "left arrow", for example.

Next, at step 806 computing device 115 can include the semantics associated with road signs 704, 706, 708, 710 in a digital map based on the semantics associated with road signs 700 and sign locations 604, 606, 608, 610. The identity of the road signs 700 based on the semantics associated with road signs 700 and the locations 604, 606, 608, 610 of the road signs 700 determined with respect to the vehicle 110 can be included in a digital map. The digital map can be stored by computing device 115 to pilot vehicle 110 and uploaded to remote server computer 120 or via V-to-I interface 111. Digital maps uploaded to remote server computer 120 can be downloaded and used for route planning, to pilot vehicles, etc.

Piloting a vehicle based on a digital map can include hardware and software processes executing on computing device 115. Computing device 115 can, as described in more detail below in relation to FIG. 9, use as input a digital map including identities and locations associated with road signs 700 to pilot vehicle 110.

In summary, computing device 115 according to process 800 can determine road sign locations in LIDAR data 300, 400, 500 by filtering out low-intensity returns and determining high-intensity return clusters 504, 506, 508, 510. The high intensity clusters 504, 506, 508, 510 are combined with video images 200, 600 to determine semantics associated with road signs 704, 706, 708, 710. The determined semantics associated with road signs 704, 706, 708, 710 can determine, at least in part, a path and a speed at which vehicle 110 can travel safely and legally in the surrounding real world.

Figure 9:
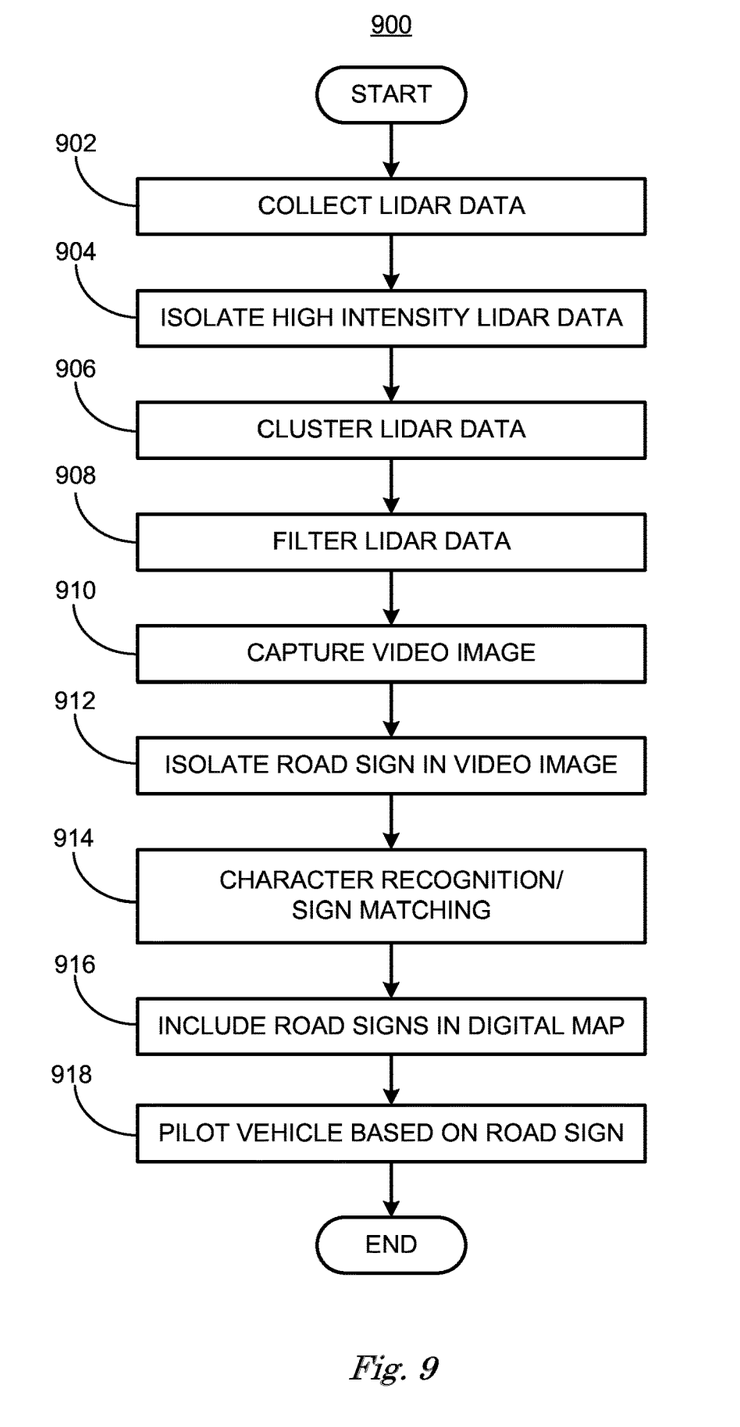
FIG. 9 is a flowchart diagram of a further example process to pilot a vehicle based on road signs.

FIG. 9 is a diagram of a flowchart, described in relation to FIGS. 2-7, of a process 900 for piloting vehicles 110 in autonomous operation. Process 900 can be implemented by a processor of computing device 115, taking as input information from sensors 116, and executing instructions and sending control signals via controllers 112, 113, 114, for example. Process 900 includes multiple steps taken in the disclosed order. Process 900 also includes implementations including fewer steps or can include the steps taken in different orders.

Process 900 begins at step 902 where computing device 115 according to the process 900 collects LIDAR data 300 including returns 302, 304, 306, 308, 310. As discussed above, LIDAR is a technique for transmitting scanned light pulses, which can be from a laser, for example, and measuring the time of flight of the pulses to determine 3D range or distance to points in the surrounding real world.

Each data point or return 302 in LIDAR data 300 has aspects including range and intensity as is known. As discussed above, road signs 204, 206, 208, 210, because of their particular construction, can provide high-intensity returns in LIDAR data 300 as discussed above in regard to FIG. 3.

Next, at step 904 computing device 115 can isolate high-intensity returns 402, 404, 406, 408, 410 in LIDAR data 400 as shown in FIG. 4 by filtering out low-intensity returns as discussed above in regard to FIG. 4.

Next, at step 906 computing device 15 can cluster LIDAR data 500 into clusters 504, 506, 508, 510 by cluster analysis as discussed above in regard to FIG. 6.

Next, at step 908 computing device 115 can filter LIDAR data 500 clusters 504, 506, 508, 510 to remove clusters that do not meet the predetermined criteria for being a road sign. Clusters 504, 506, 508, 510 that would be unrecognizable due to size and shape or distorted due to pose can be filtered from LIDAR data 300, 400 500 as discussed above in regard to FIG. 6. Clusters 504, 506, 508, 510 that are too big can be analyzed by computing device 115 to determine if they are multiple signs. Predetermined database information as discussed above in relation to FIGS. 7 and 8 can be used to determine appropriate size filters.

Next, at step 910 computing device 115 can capture video images 200, 600. Video images 200, 600 can be captured by video cameras included in sensors 116 included in vehicle 110 as discussed herein. Video images 200, 600 can be captured at known times and known locations according to inertial pose sensors included in sensors 116. As discussed in regard to FIG. 6, since LIDAR data 300, 400, 500 is captured at known times and known locations and the scan geometry of the LIDAR data 300, 400, 500 and focal length and magnification of the video cameras are known, correspondence between locations in video images 200, 600 and locations of clusters 504, 506, 508, 510 can be determined in a known manner.

Examining clusters 504, 506, 508, 510 can determine the best time to capture the video images 200, 600 based on predicting when a view of the road signs 704, 706, 708, 710 will be available that permits performing character recognition and road sign matching on the video images associated with sign locations 604, 606, 608, 610, for example. Multiple video images 200, 600 can be combined with multiple sets of LIDAR data 500 to determine views of each road sign 704, 706, 708, 710, for example. Computing device 115 can predict, for example, based on the location and pose of clusters 504, 506, 508, 510 with respect to vehicle 110, within which video image 200 600 of multiple video images 200 600 which cluster 504, 506, 508, 510 can be associated with which video images 200 600 to be successfully processed to determine semantics.

Next, at step 912 the correspondence between locations in video images 200, 600 and locations of clusters 504, 506, 508, 510 can be used to isolate video images of road sign locations 604, 606, 608, 610. Isolating video images of road sign locations 604, 606, 608, 610 permits computing device 115 to perform computationally intensive tasks on the relatively small number of pixels included in isolated video images associated with road sign locations 604, 606, 608, 610 as opposed to whole video images 200, 600, for example.

At step 914 computing device can use character recognition and sign matching to determine semantics associated with road signs 700. As discussed above in regard to FIG. 7, semantics includes text, shapes, locations, poses, and colors, for example. Associating semantics can be robust with respect to damaged or partially obscured road signs 700. For example, a stop sign can be partially obscured by foliage. Semantic associations in this can be limited to "the color red" and "ST", for example. This can be sufficient for computing device 115 to determine a stop sign semantically.

At step 916 computing device 115 can include identities of the road signs 700 based on semantics associated with road signs 700 and the road sign locations 604, 606, 608, 610 in a digital map. The digital map can be uploaded to a remote server computer 120 via V-to-I interface 111. Once uploaded to a remote server computer 120, the digital map can be combined with other digital maps, for example. Digital maps uploaded to a remote server computer 120 can be downloaded by users and/or vehicles as described above.

In one example, digital maps can be used by computing device 115 to pilot vehicle 110 as discussed above in regard to FIG. 8. The navigation subsystem can maintain a map of the nearby real world including roads 202 and objects, such as vehicles, for example. Identity and locations associated with road signs 700 can determine, at least in part, safe and legal paths to travel for vehicle 110.

Road signs 700 can permit a computing device 115 to determine a digital map and a safe and/or legal path to move vehicle 110 along within the digital map to reach a desired destination by identifying road signs 700 to in real time. Identifying and understanding semantics and therefore an identity associated with road signs 700 can permit vehicle 110 to respond to dynamic changes in traffic control such as alternate routes and speeds in construction zones. Semantics associated with road signs 700 can be used to update the database and maps with information acquired in real time from the real world surrounding vehicle 110. This permits computing device 115 to pilot vehicle 110 in dynamic traffic situations such as detours and reversible lanes, for example.

The navigation subsystem can communicate with server computer 120, mobile user device 160 or other vehicles 110, for example, via network 130 and V-to-I interface 111 to obtain digital maps constructed according to disclosed examples. Databases associated with the navigation process can store a comprehensive library of road signs 204, 206, 208, 210 and have stored appropriate commands and rules associated with each. GPS and inertial pose information can be included in sensors 116 to locate vehicle 110 on a map and determine the direction and a speed at which the vehicle is traveling, for example.

At step 918 semantics associated with road signs 700 can be output to the computing device 115 to pilot vehicle 110 based on semantics associated with the road signs 700. Virtual diver process included in computing device 115 can also rely on the maps determined and updated by the navigation subsystem based on semantics associated with road signs 700 as described above in relation to FIG. 8.

For example, navigation subsystem can determine a safe and legal path for vehicle 110 to travel based on semantics associated with road signs 700. Based on the semantics associated with road sign 704, vehicle 110 should keep its speed below 50 miles per hour. Although maps determined by the navigation subsystem can indicate a road branching off to the right near road sign 706, for example, semantics associated with road sign 706 indicate that the vehicle 110 should not enter the road since semantics associated with road sign 706 include "DO NOT ENTER". Likewise, semantics associated with road signs 708, 710 indicate that the road bends to the left and vehicle 110 should be prepared to turn left to stay in and appropriate lane on the road 202, for example.

Piloting a vehicle 110 with the computer 115 based on semantics associated with road signs 700 can include assisting an occupant-piloted vehicle 110. For example, computing device 115 can determine that occupant-piloted vehicle 110 is exceeding a posted speed limit as determined by road sign 704. Computing device 115 can alert the occupant-pilot and/or issue commands to limit the speed of vehicle 110. In similar fashion, computing device 115 can alert the occupant-pilot that they are making a right turn past a "DO NOT ENTER" sign and/or prevent the vehicle 110 from turning by not issuing commands to controllers 112, 113, 114 to turn right.

In summary, process 900 describes a process for collecting LIDAR data, isolating, clustering and filtering the data, capturing video data, isolating video images of road signs based on the LIDAR data, performing OCR and sign recognition to the isolated video images of road signs and outputting semantics associated with the isolated video images of road signs to a computing device 115.

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exact described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

We claim:

1. A method, comprising:
   determining a road sign location in LIDAR data;
   identifying a road sign in one or more video images based on the road sign location determined from the LIDAR data, wherein the video images are from a video camera and the LIDAR data are from a LIDAR sensor, wherein identifying the road sign in the video images based on the road sign location includes isolating video images of the road sign from the video images based on the road sign location, and the isolated video images are projected homographically so as to appear as if the video camera acquired the video images of the road sign location at a right angles to the primary face of the road signs; and
   including the road sign in a digital map based on the road sign identity and the road sign location.

2. The method of claim 1, further comprising:
   determining the road sign location by:
   determining locations of isolated high intensity returns in the LIDAR data; and
   determining the road sign location by clustering and filtering the locations of isolated high intensity returns in the LIDAR data.

3. The method of claim 2, wherein high intensity returns are created by retroreflective materials.

4. The method of claim 1, wherein identifying the road sign in the isolated video images based on the road sign location includes performing character recognition and sign matching on the isolated video images.

5. The method of claim 1, further comprising:
   uploading the road sign to a computing device and including the road sign in a digital map based on the road sign identity and the road sign location.

6. The method of claim 5, further comprising:
   downloading the digital map from the computing device and piloting a vehicle based on the digital map.

7. The method of claim 1, further comprising:
   determining the road sign location in two or more sets of LIDAR data.

8. The method of claim 1, further comprising:
   piloting a vehicle based on the digital map.

9. An apparatus, comprising:
   a processor; and
   a memory, the memory storing instructions executable by the processor to:
   determine a road sign location in LIDAR data;
   identify a road sign in one or more video images based on the road sign location determined from the LIDAR data, wherein the video images are from a video camera and the LIDAR data are from a LIDAR sensor, wherein identifying the road sign in the video images based on the road sign location includes isolating video images of the road sign from the video images based on the road sign location, and the isolated video images are projected homographically so as to appear as if the video camera acquired the video images of the road sign location at a right angles to the primary face of the road signs; and include the road sign in a digital map based on the road sign identity and the road sign location.

10. The apparatus of claim 9, further comprising:

determine the road sign location by:

determining locations of isolated high intensity returns in the LIDAR data; and     determining the road sign location by clustering and filtering the locations of isolated high intensity returns in the LIDAR data.

11. The apparatus of claim 10, wherein the high intensity returns are created by retroreflective materials.

12. The apparatus of claim 9, wherein identify the road sign in the isolated video images based on the road sign location includes performing character recognition and sign matching on the isolated video images.

13. The apparatus of claim 9, further comprising:

upload the road sign to a computing device and include the road sign in a digital map based on the road sign identity and the road sign location.

14. The apparatus of claim 13, further comprising:

download the digital map from the computing device and pilot a vehicle based on the digital map.

15. The apparatus of claim 9, further comprising:

determine the road sign location in two or more sets of LIDAR data.

16. The apparatus of claim 9, further comprising:

pilot a vehicle based on the digital map.

\* \* \* \* \*